US009673883B2

(12) United States Patent
Zhao et al.

(10) Patent No.: US 9,673,883 B2
(45) Date of Patent: Jun. 6, 2017

(54) METHOD AND APPARATUS FOR IMPLEMENTING CHANNEL MEASUREMENT

(75) Inventors: Yajun Zhao, Shenzhen (CN); Jianguo Wang, Beijing (CN); Xingqing Cheng, Beijing (CN); Zuomin Wu, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 13/458,273

(22) Filed: Apr. 27, 2012

(65) Prior Publication Data

US 2012/0213113 A1    Aug. 23, 2012

Related U.S. Application Data

(63) Continuation of application No. PCT/CN2010/078181, filed on Oct. 28, 2010.

(30) Foreign Application Priority Data

Oct. 28, 2009  (CN) .......................... 2009 1 0208525

(51) Int. Cl.
*H04B 7/06* (2006.01)
*H04W 72/12* (2009.01)
(Continued)

(52) U.S. Cl.
CPC ......... *H04B 7/0691* (2013.01); *H04B 7/0626* (2013.01); *H04W 24/10* (2013.01);
(Continued)

(58) Field of Classification Search
CPC ................. H04L 5/0035; H04W 24/02–24/08
See application file for complete search history.

(56) References Cited

U.S. PATENT DOCUMENTS 5,991,622 A   11/1999  Henry, Jr.
8,948,097 B2*  2/2015  Chen ..................... H04J 11/003
                                               370/329
(Continued)

FOREIGN PATENT DOCUMENTS

CN    1276937      12/2000
CN    1137557 C     2/2004
(Continued)

OTHER PUBLICATIONS

Chinese Office Action mailed Jul. 2, 2012 for corresponding Chinese Application No. 200910208525.3.
(Continued)

*Primary Examiner* — Marcus R Smith
(74) *Attorney, Agent, or Firm* — Staas & Halsey LLP

(57) ABSTRACT

A method and an apparatus for implementing channel measurement are disclosed in the present invention. The method includes: determining an antenna port subset, which is required to be measured, for a UE according to current state information of the user equipment UE; and informing the UE to perform channel measurement for the subset of antenna ports that is required to be measured and feed back channel state information. Through the present invention, when the state information of the UE meets a certain condition, the UE measures only the reference signals of a part of antenna ports, and feeds back channel state information for this part of antenna ports. Therefore, the overhead generated by the feedback of the UE to the channel state information is reduced.

5 Claims, 4 Drawing Sheets

(51) Int. Cl.
*H04W 24/10* (2009.01)
*H04W 52/24* (2009.01)
*H04W 72/04* (2009.01)

(52) U.S. Cl.
CPC ...... *H04W 72/1226* (2013.01); *H04W 52/242* (2013.01); *H04W 72/048* (2013.01)

(56) References Cited

U.S. PATENT DOCUMENTS

| | | | | |
|---|---|---|---|---|
| 2009/0291702 | A1* | 11/2009 | Imai et al. | 455/517 |
| 2010/0103900 | A1* | 4/2010 | Yeh et al. | 370/330 |
| 2010/0166098 | A1* | 7/2010 | Luz | H04B 7/0413 375/267 |
| 2011/0019715 | A1* | 1/2011 | Brisebois | H04B 7/0626 375/130 |
| 2011/0194504 | A1* | 8/2011 | Gorokhov et al. | 370/329 |
| 2012/0176982 | A1* | 7/2012 | Zirwas | H04B 7/024 370/329 |
| 2014/0369262 | A1 | 12/2014 | Roh et al. | |

FOREIGN PATENT DOCUMENTS

| | | |
|---|---|---|
| CN | 1918840 | 2/2007 |
| CN | 1921463 | 2/2007 |
| CN | 1946000 | 4/2007 |
| CN | 100505910 | 6/2009 |
| CN | 101496306 | 7/2009 |
| CN | 101606356 A | 12/2009 |
| EP | 1865642 | 12/2007 |
| JP | 2006-524966 | 11/2006 |
| JP | 2007-528134 | 10/2007 |
| JP | 2008-536406 | 9/2008 |
| JP | 2009-512272 | 3/2009 |
| JP | 2009-513061 | 3/2009 |
| JP | 2010-520659 | 6/2010 |
| JP | 2010-532950 | 10/2010 |
| WO | WO2004/095851 | 11/2004 |
| WO | WO2004/112325 | 12/2004 |
| WO | 2005/081444 | 9/2005 |
| WO | WO2006/106613 | 10/2006 |
| WO | WO2006/110737 | 10/2006 |
| WO | WO2007/040456 | 4/2007 |
| WO | WO2007046758 | 4/2007 |
| WO | 2007/142623 | 12/2007 |
| WO | 2008/096997 | 8/2008 |
| WO | WO2008/108698 | 9/2008 |
| WO | 2008/136614 | 11/2008 |
| WO | WO2009/008787 | 1/2009 |

OTHER PUBLICATIONS

Chinese Office Action mailed Dec. 31, 2012 for corresponding Chinese Application No. 200910208525.3.
3GPP TS 36.331 V8.7.0, "3$^{rd}$ Generation Partnership Project; Technical Specification Group Radio Access Network; Evolved Universal Terrestrial Radio Access (E-UTRA) Radio Resource Control (RRC); Protocol specification" Release 8, Sep. 2009, pp. 1-208.
International Search Report mailed Feb. 10, 2011 issued in corresponding International Patent Application No. PCT/CN2010/078181.
Huawei, "Discussion on the definition of eight antenna ports in DL LTE-A", 3GPP TSG RAN WG1 #56bis, Mar. 2009, 5 pages.
Huawei, "Considerations on downlink antenna mapping", 3GPP TSG RAN WG1 #57, May 2009, 7 pages.
Fujitsu, "CoMP Cell Set Configuration", 3GPP TSG RAN WG2 Meeting #66, May 2009, 5 pages.
Panasonic, "Required Information at the UE in CoMP", 3GPP TSG RAN WG1 Meeting #57, Jul. 2009, 2 pages.
Chinese Search Report issued Mar. 28, 2012 in corresponding Chinese Patent Application No. 200910208525.3.
Chinese Office Action issued Jul. 2, 2012 in corresponding Chinese Patent Application No. 200910208525.3.
Extended European Search Report issued Sep. 10, 2012 in corresponding European Patent Application No. 10826090.2.
International Search Report of Corresponding PCT Application PCT/CN2010/078181 mailed Feb. 10, 2011.
Chinese Office Action and Search Report dated Aug. 11, 2016 in related Chinese Application No. 201410040140.1 (5 pages).
TSG-RAN WG1 #54 R1-083069, Ericsson: "*LTE-Advanced-Coordinated Multipoint transmission/reception*"; Aug. 2008; (4 pages).
European Office Action dated Feb. 17, 2017 in related European Patent Application No. 10826090.2 (6 pages).

\* cited by examiner

METHOD AND APPARATUS FOR IMPLEMENTING CHANNEL MEASUREMENT

CROSS-REFERENCE TO RELATED APPLICATIONS

This application is a continuation of International Application No. PCT/CN2010/078181, filed on Oct. 28, 2010, which claims priority to Chinese Patent Application No. 200910208525.3, filed on Oct. 28, 2009, both of which are hereby incorporated by reference in their entireties.

FIELD OF THE INVENTION

The present invention relates to the field of communications technologies, and in particular, to a method and an apparatus for implementing channel measurement.

BACKGROUND OF THE INVENTION

OFDM (Orthogonal Frequency Division Multiplexing, orthogonal frequency division multiplexing) is a special multi-carrier transmission technology. It separates a wide transmission bandwidth into multiple mutually orthogonal subcarriers for transmitting data in parallel.

In an OFDM system, to schedule radio resources, the base station needs to obtain the downlink channel state information of the UE. Generally, the information is generally obtained after the UE (User Equipment, user equipment) measures and reports it. The measuring and reporting method mainly includes: The base station transmits a reference signal; and the UE uses the received reference signal to measure and obtain the downlink channel state information; and then the UE feeds back the measured downlink channel state information to the base station. The base station performs radio resource scheduling for the received downlink channel state information that is fed back by each UE, and decides how to allocate limited time and frequency resources to each UE, so as to maximize the usage of radio resources.

However, in the process of developing the present invention, the inventor finds that in an MIMO (Multiple Input Multiple Output, multiple input multiple output) system, the base station has multiple antenna ports, and each antenna port has a reference signal to be sent. The UE needs to measure channel state information of all antenna ports, and feeds back the information to the base station. Therefore, the overhead of measurement and feedback is huge.

SUMMARY OF THE INVENTION

The present invention provides a method and an apparatus for implementing channel measurement to reduce overhead generated by the feedback of a UE to channel state information.

The present invention provides the following solutions:

A method for implementing channel measurement, including:

determining an antenna port subset, which is required to be measured, for a UE according to current state information of the UE; and informing the UE to perform channel measurement for the antenna port subset that is required to be measured and feed back channel state information.

An apparatus for implementing channel measurement, including:

a determining unit, configured to determine an antenna port subset, which is required to be measured, for a UE according to current state information of the UE; and an informing unit, configured to inform the UE to perform channel measurement for the antenna port subset that is required to be measured and feed back channel state information.

A user equipment, including:

a notification receiving unit, configured to receive a notification sent by a base station and acquire an antenna port subset that is required to be measured, where the antenna port subset that is required to be measured is determined by the base station according to current state information of the UE; and a measuring and feedback unit, configured to perform channel measurement for the antenna port subset that is required to be measured and feed back channel state information.

A method for implementing channel measurement, including:

selecting an antenna port subset that is required to be measured from pre-partitioned antenna port subsets according to current state information of a UE obtained from a base station; and performing channel measurement for the an antenna port subset that is required to be measured and feeding back channel state information.

An apparatus for implementing channel measurement, including:

a selecting unit, configured to select an antenna port subset that is required to be measured from pre-partitioned antenna port subsets according to current state information of a UE obtained from a base station; and a feedback unit, configured to perform channel measurement for the an antenna port subset that is required to be measured and feed back channel state information.

According to the specific embodiments of the present invention, the present invention discloses the following technical effects:

According to the embodiments of the present invention, the antenna port subset which is required to be measured can be selected for the UE according to the current state information of the UE, and the UE is informed to perform channel measurement for the antenna port subset that is required to be measured and the channel state information is fed back. Through the present invention, when the state information of the UE meets certain conditions, the UE measures only the reference signals of a part of antenna ports, and feeds back the channel state information for the part of antenna ports. Therefore, the overhead generated by the feedback of the UE to the channel state information is reduced.

BRIEF DESCRIPTION OF THE DRAWINGS

To make the technical solutions according to the embodiments of the present invention or the prior art clearer, the following outlines the accompanying drawings for illustrating the embodiments. Evidently, the accompanying drawings in the following description are merely about some embodiments of the present invention, and those skilled in the art can derive other drawings from such accompanying drawings without making any creative effort.

DETAILED DESCRIPTION OF THE EMBODIMENTS

The technical solutions according to the embodiments of the present invention are described clearly and comprehensively with reference to the accompanying drawings of the embodiments of the present invention. Evidently, the embodiments to be described are merely some rather than all embodiments of the present invention. All other embodiments, which can be derived by those skilled in the art from the embodiments given herein without making any creative effort, shall fall within the protection scope of the present invention.

Embodiment 1

Figure 1:
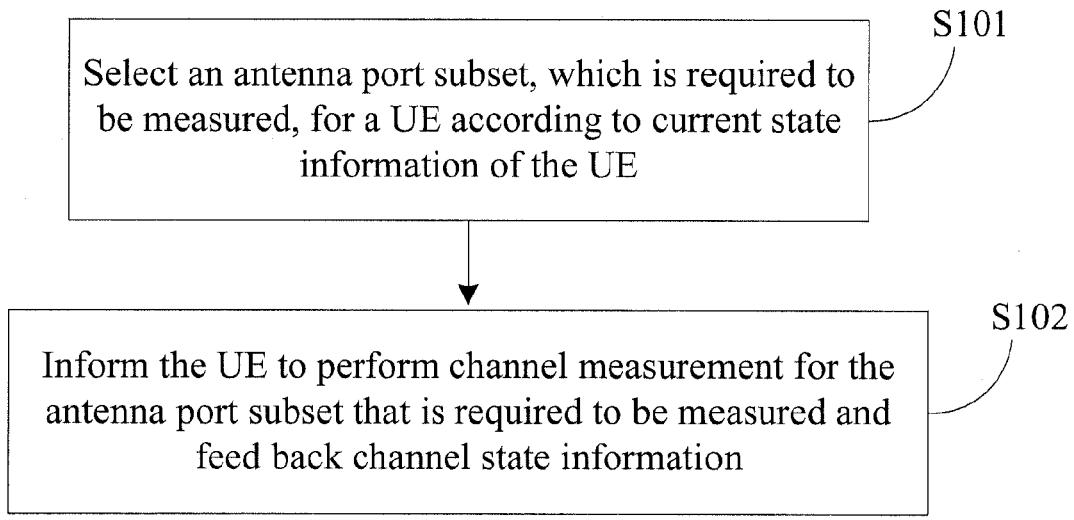
FIG. 1 is a flowchart of a method according to a first embodiment of the present invention.

As shown in FIG. 1, a channel measurement method provided in Embodiment 1 of the present invention includes the following steps:

S101: Select an antenna port subset, which is required to be measured, for a UE according to current state information of the UE.

S102. Inform the UE to perform channel measurement for the antenna port subset that is required to be measured and feed back channel state information.

The current state information of the UE may include the moving speed of the UE, geographic location relationship between the UE and each antenna port, information on the path loss relationship between the UE and each antenna port, and the current transmission mode of the UE. During the selection, one or more antenna ports may be selected from all antenna ports of a base station according to the state information to form an antenna port subset that is required to be measured, and the UE is informed to measure and feed back only the channel state information between the UE and the antenna port subset that is required to be measured. For example, the base station learns the geographic location relationship between the UE and each antenna port from the information such as signal strength reported by the UE, selects one or more antenna ports closest to the UE to form a subset of antenna ports that is required to be measured, and notifies the UE. After receiving the notification, the UE measures only the subset of antenna ports that is required to be measured, and does not measure antenna ports other than the subset of the antenna ports. Afterward, the UE feeds back the channel state information, which is obtained through the measurement and corresponds to the corresponding subset of the antenna ports, to the base station.

In practical application, for ease of selection, a set formed by the antenna ports on the base station may be partitioned into multiple antenna port subsets beforehand. At the time of selecting the antenna port subset, which is required to be measured, for the UE subsequently, the antenna port subset may be selected for the UE from the partitioned antenna port subsets according to the current state information of the UE.

In this mode, the base station may notify the UE of all possible modes of sets beforehand, and identify each set (for example, by numbering). When the channel state information needs to be obtained, the identifier of one or more antenna port subsets is notified to the UE according to the state of the UE. The UE performs measurement and feedback for the channel state information based on a subset of a corresponding identifier.

For example, N antenna ports are configured for base station A, and the N antenna ports are partitioned into m antenna port subsets: $N_0, N_1, N_2, \ldots, N_m$. The antenna port subsets may overlap each other. For example, $N_0$ may include antenna port 1 and antenna port 2, and $N_1$ may include antenna port 2 and antenna port 3, where antenna port 2 is in both $N_0$ and $N_1$. The specific partition may be determined according to actual conditions, which is not restricted here. Base station A may inform the UE to measure one or more or all of the antenna port subsets among the m antenna port subsets according to the state information of the UE, and then the UE feeds back the measured channel state information to base station A. The following gives more details with reference to specific implementation modes.

Implementation mode 1: In implementation mode 1, the set formed by all antenna ports of the base station may be partitioned into antenna port subsets, where the subsets are applicable to different UE moving speeds. That is, the antenna port subsets may be partitioned according to time correlation of a channel. For example, the set of all antenna ports may be partitioned into two antenna port subsets. One antenna port subset is applicable to a high-speed UE and sends a reference signal at a high frequency; and the other antenna port subset is applicable to a low-speed UE and sends a reference signal at a relatively low frequency.

When the UE is required to report channel state information, a high-speed UE may be informed to measure only the antenna port subset that is applicable to the high-speed UE and feed back the channel state information; and a low-speed UE may be informed to measure the antenna port subset that is applicable to the low-speed UE and feed back the channel state information. In this way, it can be ensured that the low-speed UE may not cause a waste of resources and the high-speed UE can feed back the change of a channel state to the base station in time at a frequency that is high enough. Meanwhile, for both a low-speed UE and a high-speed UE, it is not necessary to measure all antenna ports. Therefore, feedback overhead is reduced, and system performance is improved on the whole. Definitely, for a low-speed UE, both the high-speed antenna port subset and the low-speed antenna port subset may be measured.

For example, all antenna ports of the base station may be grouped into antenna port subset A and antenna port subset B. A transmission period (high frequency) of antenna port subset A is short; and a long transmission period of antenna port subset B is long (for example, the transmission period of antenna port subset A is 5 ms, and the transmission period of antenna port subset B is 10 ms). Moreover, both UE1 and UE2 belong to the base station, where UE1 is a high-speed UE, and UE2 is a low-speed UE. Therefore, the base station may inform UE1 to measure antenna port subset A and inform UE2 to measure antenna port subset B; or inform UE2 to measure both antenna port subset A and antenna port subset B.

In practical application, the moving speeds of UEs may vary. For example, a user may be in a fixed location, a user may be walking, another user may be on a means of transport that is moving quickly, and so on. The moving speed of a UE corresponds to the time correlation of a channel. For example, when the UE moves at a low speed, the time correlation of the channel is stronger, and the channel state information does not change obviously with time, and therefore, the UE may feed back the channel state information at a lower frequency; conversely, when the UE moves at a high speed, the time correlation of the channel is weaker, and the channel state information may change very obviously with time, and therefore, the UE may need to measure and feed back the channel state information at a higher frequency to obtain real-time channel state information more accurately. The frequency of the UE measuring and feeding back the channel state information is related to the frequency of the base station sending a reference signal. That is, when the base station sends the reference signal at a high frequency, the UE can measure and feed back the channel state information at a higher frequency; when the base station sends the reference signal at a low frequency, the UE has to measure and feed back the channel state information at a low frequency.

In the prior art, all antenna ports of the base station send reference signals at the same frequency. In fact, UEs under the same base station may be in different states, there is always a UE that is moving quickly, and there is a UE that is moving slowly or even stationary. If all antenna ports send reference signals at a higher frequency, as regards the UEs that are moving slowly or even stationary, resource waste is inevitably caused because their channel states change slowly and the channel states do not need to be measured or fed back at a higher frequency. If all antenna ports send reference signals at a lower frequency, as regards the UEs that are moving quickly, the base station may be incapable of obtaining channel state information that is accurate enough.

Through the method provided in implementation mode 1, each antenna port of the base station may send the reference signal at a different frequency. If a UE moves quickly, the UE may be informed to measure the reference signal of the antenna port subset that has a higher sending frequency; otherwise, the UE is informed to measure the reference signal of the antenna port subset that has a lower sending frequency. Therefore, implementation mode 1 has the following benefits: it may be ensured that a UE that moves quickly can feed back the channel state information that is accurate enough and a UE that moves slowly may not cause a waste of resources.

It should be noted that in practical application, the moving speeds of the UE may include more than high speed and low speed. For example, the moving speeds of the UE may be partitioned into several different intervals. Accordingly, the antenna ports are partitioned into multiple antenna port subsets. When an antenna port subset is specifically selected for the UE, which interval the moving speed of the UE falls may be judged, and a corresponding antenna port subset is selected.

It should be noted that the base station may obtain information on the moving speed of the UE through the uplink channel information of the UE, the specific method can be implemented in the prior art, and details are not repeated herein again.

Implementation mode 2: In implementation mode 2, a set formed by all antenna ports of the base station may be partitioned into multiple antenna port subsets according to the geographic location of an antenna. For example, antenna ports geographically close to each other form an antenna port subset, and other antenna ports geographically close to each other form other antenna port subsets. When a UE is required to feed back channel state information, a subset of antenna ports whose distance to the UE meets a preset condition may be selected according to the current geographic location information of the UE; and/or, an antenna port subset whose path loss to the UE meet a preset condition may be selected according to information on the path loss between the current UE and each antenna port subset (the information on the path loss may be inferred according to the geographic location information of the UE or may be obtained from the uplink information of the UE).

Figure 2:
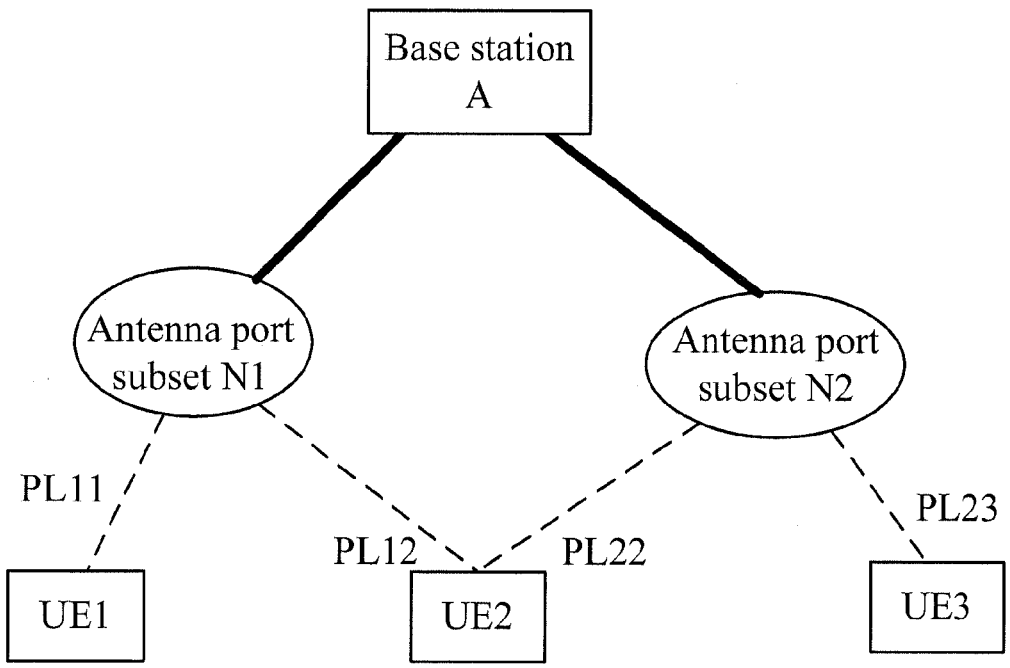
FIG. 2 is a schematic diagram of a single-cell distributed antenna system according to an embodiment of the present invention.

A single-cell distributed antenna system shown in FIG. 2 is taken as an example. Both antenna port subset N1 and antenna port subset N2 that are geographically distributed in different locations belong to base station A; accordingly, reference signals used by base station A for channel measurement are partitioned into two antenna port subsets A and B (antenna ports are in a one-to-one mapping relationship with reference signals), and they are transmitted by antenna port subset N1 and antenna port subset N2 respectively. $PL_{ij}$ (i=1, 2; j=1, 2, 3) is path loss from antenna port subset i to $UE_j$. Considering difference of path loss from each antenna port subset to the UE, the UE may use different antenna port subsets. For example, a possible solution of allocating and measuring antenna ports is: UE1 measures a reference signal corresponding to antenna port subset N1; UE3 measures a reference signal corresponding to antenna port subset N2; and UE2 measures reference signals corresponding to antenna port subset N1 and antenna port subset N2.

In practical application, multiple antenna ports of a base station may be distributed in multiple locations; and the relative relationship between the current location of the UE and the location of an antenna port determines the quality of channel state information.

For example, if the UE is close to an antenna port, the path loss of the UE receiving a signal may be smaller, and the signal received by the UE from the antenna port may be stronger, and therefore, a channel state may be better; conversely, if the UE is very distant from an antenna port, the path loss of the UE receiving a signal may be larger, and the signal received by the UE from the antenna port may be much weaker, and therefore, a channel state may be worse. In this case, the channel state information of the very distant antenna port may bring little impact on the radio resource scheduling performed by the base station, and finally service information borne by the antenna port may be a little, or even the antenna port is not used for bearing the service information of the UE. Therefore, in the case that all antenna ports are measured and the channel state information is fed back, the channel state measurement and feedback for the very distant antenna port lead to a waste of resources.

Through the method provided in implementation mode 2, the UE may be informed not to measure the reference signal of the antenna port subset very distant from the UE, and not to feed back corresponding channel state information. Therefore, the overhead of measurement and feedback is reduced.

It should be noted that the base station may obtain the geographic location information of the UE through the uplink channel information of the UE, the specific method can be implemented in the prior art, and details are not repeated herein again.

Implementation mode 3: In practical application, a base station may select a different transmission mode for a UE according to state information of the UE, to ensure that the UE obtains the best quality of service and ensure the best performance of a system. Transmission modes may include:

CoMP (Coordinated Multi-point Transmission, coordinated multi-point transmission) mode, JP (Joint Processing, joint processing) mode, CBF (Coordinated beam forming, coordinated beam forming) mode, CBS (Coordinated beam switching, coordinated beam switching) mode, single-cell service mode, multi-user mode, and so on.

In implementation mode 3, a set of all antenna ports of the base station may be partitioned into antenna port subsets applicable to different transmission modes. For example, some antenna ports may be grouped as an antenna port subset applicable to the CoMP mode, and other antenna ports are grouped as an antenna port subset applicable to a single-cell service mode. In this way, when the UE is required to feed back channel state information, an antenna port subset applicable to the transmission mode of the UE may be selected according to the current transmission mode used by the UE, and then the UE is informed to feed back the channel state information to the base station with regard to the antenna port subset applicable to the transmission mode of the UE. For example, UE1 is in the CoMP mode, and therefore, the base station informs UE1 to measure only the set of reference signals in the CoMP mode and feed back corresponding channel state information.

In practical application, in different transmission modes, special configuration may be required for the sending of the reference signal. For example, when a UE is in the CoMP mode, power boosting (power boosting) needs to be performed for the transmission power of the reference signal. In the prior art, the transmission power of all antenna ports has to be boosted. However, other UEs that belong to the base station may be in other modes such as the single-cell service mode. In such modes, high transmission power is not required. Therefore, in this case, for the UEs that are not in the CoMP mode, the high transmission power of the reference signal leads to a kind of waste obviously.

In the method provided in implementation mode 3, because the antenna ports are partitioned beforehand, only the reference signal sent by the antenna port subset applicable to the CoMP mode may be configured according to the feature of the CoMP mode, and special processing may not be performed for another antenna port subset. Therefore, another merit of implementation mode 3 is: When the CoMP mode exists, special configuration performed for the reference signals of all antenna ports can be avoided, and resources are saved.

For example, for the reference signal of the antenna port subset applicable to the CoMP mode, within a CoMP cell set, the data of a neighboring cell on an RE (resource element, resource element) corresponding to the reference signal is not sent; for the reference signal of another antenna port subset not applicable to the CoMP mode, within the CoMP cell set, the data of the neighboring cell on the RE corresponding to the reference signal is still sent, namely, no special configuration is performed.

Alternatively, power boosting may be performed for the reference signal of the antenna port subset applicable to the CoMP mode, and power boosting may not be performed for the reference signal of the antenna port subset not applicable to the CoMP mode.

Further, for example, for the reference signal of the antenna port subset applicable to the CoMP mode, within the CoMP cell set, the reference signal corresponding to each cell is configured as code partition quadrature or frequency partition quadrature; for the reference signal of another antenna port subset not applicable to the CoMP mode, within the CoMP cell set, the reference signal corresponding to each cell may not be configured as code partition quadrature or frequency partition quadrature.

It should be noted that after the antenna ports are grouped into subsets according to transmission modes, only the reference signal sent by the antenna port subset applicable to the CoMP mode may be configured according to the feature of the CoMP mode; after completion of the grouping and configuration, each subset of the antenna ports may send the reference signal according to the configured mode, without being affected by the state of the UE.

Further, it should be noted that because the UE may be in a default transmission mode in an initial state, the base station needs to decide, according to the channel state information fed back by the UE, whether to change the transmission mode of the UE. Therefore, in implementation mode 3, the UE may feed back the channel state information of all antenna ports first; and then, when the base station selects a new transmission mode for the UE according to the channel state information of the UE, the base station informs the UE to feed back channel state information for only the antenna port applicable to the transmission mode. Definitely, after a transmission mode is selected for the UE, another transmission mode may be selected for the UE according to new state information. In this case, a corresponding antenna port subset may be selected again, and then the UE is informed to measure the antenna port subset and perform feedback.

Definitely, the implementation modes above may be combined to partition the antenna ports of the base station according to multiple partition factors. At the time of selecting an antenna port subset for the UE, a subset may be selected from antenna port subsets under a corresponding grouping mode according to any of the obtained state information of the UE.

At the time of selecting a subset of antenna ports for the UE from the pre-partitioned antenna port subsets according to the current state information of the UE, the number of selected antenna port subsets required to be measured is one or more.

When the number of subsets of antenna ports required to be measured is one, the UE may perform channel measurement based on the notified reference signal of the antenna port subset, and obtain the channel state information corresponding to the antenna port subset. When the number of antenna port subsets required to be measured is more than one, the channel state information that may be fed back by the UE may include not only the channel state information of each antenna port subset, but also information on channel state cross-correlation between the subsets, in order to reflect the channel state information more accurately. The combination modes involved by the cross-correlation information may be diverse. However, because it is required to make the base station learn which type of information is fed back by the UE, the UE cannot feed back the cross-correlation information arbitrarily; otherwise, the base station is incapable of identifying the type of information. Therefore, in practical application, a mode that the base station notifies the UE which information needs to be fed back, for example, the UE may be informed to feed back the following information:

(i) The UE may be informed to perform channel measurement for the reference signal of each antenna port subset that is required to be measured and feed back the channel state information of each antenna port subset that is required to be measured. For example, UE1 is notified that the reference signals of antenna port subsets N1, N2, and N3 are required to be measured, and then UE1 may obtain channel state information CSI1/CQH/PMI1/RI1 between UE1 and antenna port subset N1, channel state information CSI2/CQI2/PMI2/RI2 between UE1 and the antenna port subset N2, channel state information CSI3/CQI3/PMI3/RI3 between UE1 and the antenna port subset N3. Afterward, UE1 feeds back the obtained CSI1/CQH/PMI1/RI1, CSI2/CQI2/PMI2/R12, and CSI3/CQI3/PMI3/RI3 through measurement to the base station; and the base station performs radio resource scheduling for UE1 and other UEs according to the channel state information fed back by UE1 and other UEs.

(ii) The UE may be informed to perform channel measurement for the reference signal of each antenna port subset that is required to be measured and feed back the channel state information of each antenna port subset that is required to be measured and information on the channel state cross-correlation between the antenna port subsets required to be measured. For example, UE1 is notified that the antenna port subsets N1, N2, and N3 are required to be measured, and then UE1 obtains channel state information CSI1 between UE1 and antenna port subset N1, channel state information CSI2 between UE1 and the antenna port subset N2, and channel state information CSI3 between UE1 and the antenna port subset N3. Meanwhile, information R12 on channel state cross-correlation between UE1 and N1 and N2, and/or information R13 on channel state cross-correlation between UE1 and N1 and N3, and/or information R23 on channel state cross-correlation between UE1 and N2 and N3, and/or information R123 on channel state cross-correlation between UE1 and N1, N2 and N3 are obtained through measurement. Afterward, UE1 feeds back CSI1, CSI2, CSI3, R12, R13, R23, R123 to the base station; and the base station performs radio resource scheduling for UE1 and another UE according to the channel state information fed back by UE1 and other UEs.

By feeding back the channel state cross-correlation information, the base station can learn not only the channel state information of each channel, but also cross-correlation between the channels, so as to provide more effective information for radio resource scheduling. It should be noted that, in theory, the channel state cross-correlation information may be obtained by the base station through calculation after the base station receives the channel state information of each channel. However, the channel state cross-correlation information is obtained by the UE through calculation because the UE generally needs to process the channel state information to facilitate transmission in a channel before the UE feeds back the channel state information to the base station. Therefore, the channel state information obtained by the base station is processed by the UE. If the base station calculates the information on channel state cross-correlation between channels after receiving the channel state information, the information is not accurate. However, the UE may obtain the channel state cross-correlation information through calculation according to original channel measurement data, so as to ensure the accuracy of the channel state cross-correlation information.

(iii) All antenna port subsets required to be measured are combined, and the UE is informed to perform channel measurement based on the reference signals of all combined antenna port subsets required to be measured, and to feed back the channel state information of all combined antenna port subsets. For example, UE1 is notified that antenna port subset N1 and antenna port subset N2 are required to be measured, where N1 includes antenna ports 1 and 2, and N2 includes antenna ports 3 and 4, and therefore, UE1 obtains the channel state information CSI12 between UE1 and all antenna ports (antenna ports 1, 2, 3, and 4) in N1 and N2 through calculation, and then feeds back CSI12 to the base station; and the base station performs radio resource scheduling for UE1 and another UE according to the channel state information fed back by UE1 and another UE.

(iv) A part of antenna port subsets required to be measured are combined, and the UE is informed to perform channel measurement based on the reference signals of the partially combined antenna port subsets required to be measured, and to feed back the channel state information of each combination of antenna port subsets, and/or information on channel state cross-correlation between every two combinations of the antenna port subsets. For example, UE1 is notified that antenna port subsets N1, N2, N3, and N4 are required to be measured, and the base station may combine antenna port subsets N1 with N2 and combine N3 with N4; UE1 is informed to measure the channel state information of N12 to obtain CSI12, where N12 is a combination of antenna port subset N1 and antenna port subset N2; and measure the channel state information of N34 to obtain CSI34, where N34 is a combination of antenna port subset N3 and antenna port subset N4; meanwhile, information R1234 on channel state correlation between N12 and N34 may be obtained through calculation. Afterward, CSI12, CSI34, R1234 are fed back to base station A.

Definitely, other partial combinations are applicable. For example, the base station may inform UE1 to measure the channel state information of N13 to obtain CSI13, where N13 is a combination of antenna port subset N1 and antenna port subset N3; and measure the channel state information of N24 to obtain CSI24, where N24 is a combination of antenna port subset N2 and antenna port subset N4; meanwhile, information R1324 on channel state correlation between N13 and N24 may be obtained through measurement. Afterward, UE1 feeds back CSI13, U2CSI24, and R1324 to base station A. The base station performs radio resource scheduling for UE1 and other UEs according to the channel state information fed back by UE1 and other UEs. Definitely, according to the different number of antenna port subsets, the partial combination modes are diverse, and details are not illustrated exhaustively here.

It should be noted that the channel state information of an antenna port subset is obtained by measuring the reference signal of each antenna port in the antenna port subset. The information on channel state cross-correlation between antenna port subsets reflects the cross-correlation between the antenna port subsets. For example, as regards the information on channel state cross-correlation between N1 and N2, the channel state information CSI1 of N1 and the channel state information CSI2 of N2 may need to be calculated out first before the correlation between the two is calculated. However, the channel state information of N12 that is a combination of antenna port subsets N1 and N2 is obtained by measuring the reference signal of each antenna port in N1 and measuring the reference signal of each antenna port in N2. That is, the two antenna port subsets are combined, and then the channel state information of the combination is obtained. For example, N1 includes antenna ports 1 and 2, N2 includes antenna ports 3 and 4, and the channel state information of the combined subset N12 of antenna ports is calculated according to the reference signals of antenna ports 1, 2, 3, and 4 directly.

It should be noted that as regards the UE, how to calculate the channel state information of the antenna port subset and the information on channel state cross-correlation between the antenna port subsets according to the reference signal of each antenna port can be implemented in the prior art, and details are not repeated herein again.

Persons of ordinary skill in the art understand that all or part of the steps of the method specified in the embodiment above may be implemented by a program informing relevant hardware. The program may be stored in computer readable storage media. When the program runs, the following steps are included: determining an antenna port subset, which is required to be measured, for a UE according to current state information of the user equipment UE; and informing the UE to perform channel measurement for the antenna port subset that is required to be measured and feed back channel state information. The storage media may be ROM/RAM, magnetic disk, CD-ROM or others.

Embodiment 2

Figure 3:
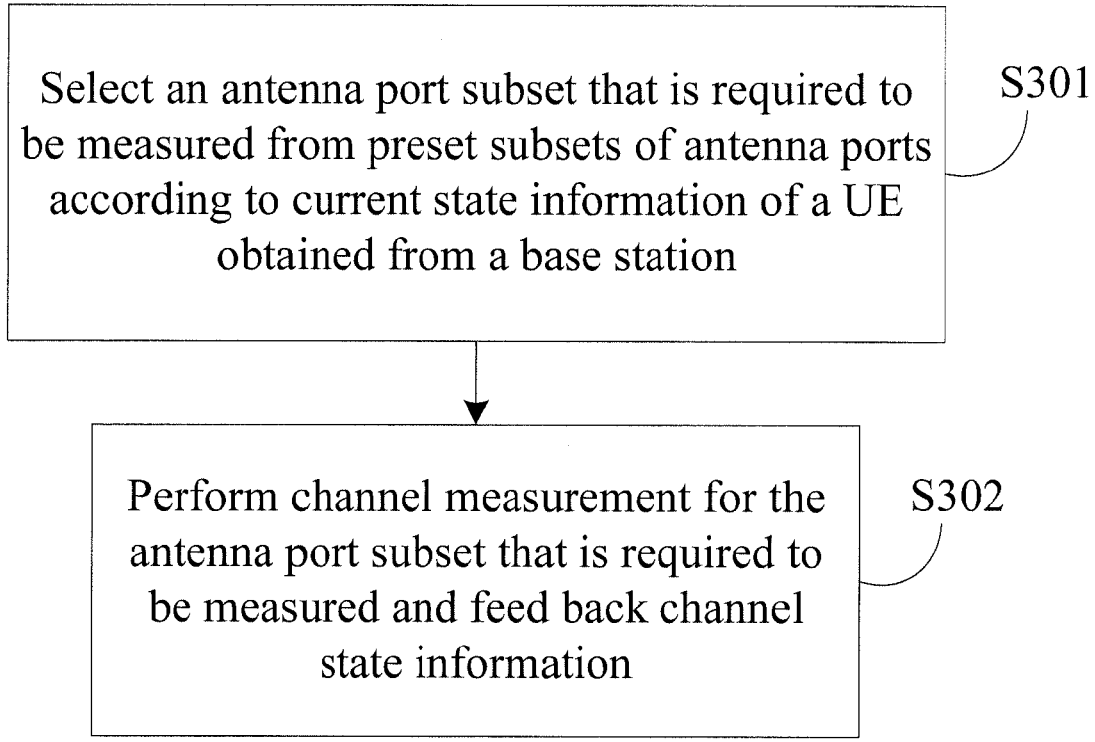
FIG. 3 is a flowchart of a method according to a second embodiment of the present invention.

As shown in FIG. 3, a channel measurement method provided in Embodiment 2 includes the following steps:

S301. Select an antenna port subset that is required to be measured from pre-partitioned antenna port subsets according to current state information of a UE obtained from a base station.

It should be noted that a UE may obtain its own state information (including current transmission state of the UE, geographic location, path loss, and moving speed) from the downlink channel information of the base station. The downlink channel message may not be exclusively used as a channel measurement indication, but the UE can obtain required state information from the message as long as the UE can receive the message. Besides, because the state information is obtained from the downlink channel message of the base station, it can be ensured that the base station is also aware of the current state of the UE. In this way, the base station can accurately obtain the basis for UE to select an antenna port subset, and can accurately parse the information fed back by the UE.

S302. Perform channel measurement for the antenna port subset that is required to be measured and feeding back channel state information.

Specifically, when the UE selects an antenna port subset that is required to be measured from pre-partitioned antenna port subsets according to the current state information of the UE obtained by the base station, the UE may obtain the current state information of the UE from the base station first, and then select an antenna port subset that is required to be measured from the pre-partitioned antenna port subsets according to a mapping relationship between the current state information of the UE and the antenna port subset, where the mapping relationship is pre-negotiated with the base station. Besides, the UE may feed back identification information of the antenna port subset to the base station while feeding back the channel state information to the base station.

When the number of antenna port subsets required to be measured is more than one, the UE needs to feed back a channel state in a mode that can be identified by the base station. Specific implementation modes may include the following. Mode 1: The UE feeds back the channel state information in a mode pre-negotiated with the base station, for example, the base station beforehand notifies the UE of information, such as the order of feeding back the channel state information and/or the mode of combining the antenna port subsets (the information may be carried in the notification to the UE indicating how the antenna ports are grouped), so that the base station identifies and parses the information correctly; mode 2: the UE selects at discretion the order of feeding back the channel state information and/or the mode of combining the antenna port subsets and so on. However, in mode 2, it is required to feed back the identification information of the antenna port subset and/or the identification information of the combination of antenna port subsets to the base station at the time of feeding back the channel state information, so that the base station can identify and parse the information correctly. Specifically, information such as the identifier of the antenna port subset and/or the identifier of the combination is added into a message used for feeding back the channel state information, to notify the base station of the order of feeding back the selected channel state information and the mode of combining the antenna port subsets and so on.

Embodiment 2 differs from Embodiment 1 in that: In Embodiment 1, the base station selects the antenna port subset, which is required to be measured, for the UE when the UE is required to feed back the channel state information; in Embodiment 2, the result and the factors of grouping the antenna ports are notified to the UE beforehand, and the UE may, automatically, select a corresponding antenna port subset to perform measurement according to the state information of the UE, and feed back the channel state information. That is, the entity for performing each step in Embodiment 1 is a base station, and the entity for performing each step in Embodiment 2 is a UE.

The specific method of grouping antenna ports into subsets may be the same as that described in Embodiment 1, and details are not repeated here any further.

The following describes Embodiment 2 in detail through a specific example.

For example, when antenna ports are grouped to subsets according to the transmission mode of the UE, the base station may notify the UE of all possible modes of sets beforehand, and identify a transmission mode corresponding to each set. When the UE is in a certain transmission mode, the UE measures and feeds back the channel state information for a set of the corresponding mode. Further, a mode switching identifier may be set. If the switching identifier notified by the cell in advance to the UE refers to switching automatically according to the transmission mode, and then the UE measures and feeds back the channel state information for the set of the corresponding mode when the UE is in a certain transmission mode; otherwise, even if the UE is in a certain transmission mode, the UE may not switch the measured set automatically.

In this embodiment, because the base station is aware of the current transmission mode of the UE, the base station can learn the antenna port subset whose channel state information is fed back by the UE. It can be seen that, in the method provided in Embodiment 2, the example is a preferred implementation mode.

Persons of ordinary skill in the art understand that all or part of the steps of the method specified in the embodiment above may be implemented by a program informing relevant hardware. The program may be stored in computer readable storage media. When the program runs, the following steps are included: selecting an antenna port subset that is required to be measured from pre-partitioned antenna port subsets according to current state information of a UE obtained from a base station; and performing channel measurement for the antenna port subset that is required to be measured and feeding back channel state information. The storage media may be ROM/RAM, magnetic disk, CD-ROM or others.

Figure 4:
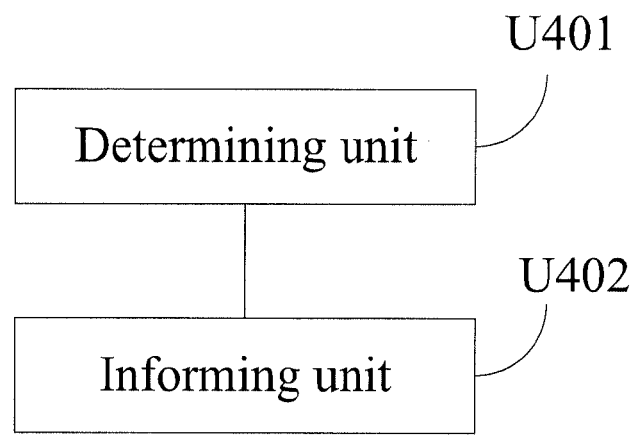
FIG. 4 is a schematic diagram of an apparatus according to an embodiment of the present invention.

Corresponding to the method provided in Embodiment 1 of the present invention, an embodiment of the present invention provides an apparatus for implementing channel measurement. As shown in FIG. 4, the apparatus includes:

a determining unit U401, configured to determine an antenna port subset, which is required to be measured, for a UE according to current state information of the UE; and an informing unit U402, configured to inform the UE to perform channel measurement for the antenna port subset that is required to be measured and feed back channel state information.

Through the apparatus provided in the embodiment of the present invention, in view of UE state information, the base station may inform the UE to measure and feed back only the channel state information of a part of antenna ports. Therefore, the overhead generated by the feedback of the UE to the channel state information is reduced.

Figure 5:
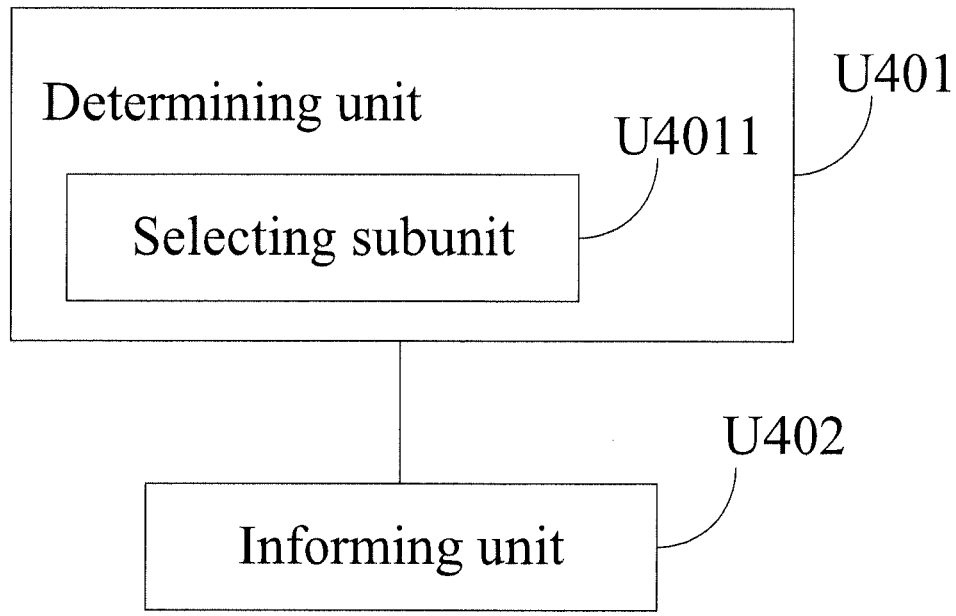
FIG. 5 is a schematic diagram of another apparatus according to an embodiment of the present invention.

In practical implementation, an antenna port applicable to the current state of the UE may be determined from multiple antenna ports of the bases station directly, and the antenna ports (may be one or more antenna ports) serve as an antenna port subset that is required to be measured; or an antenna port subset may be partitioned into multiple antenna port subsets beforehand, and then an antenna port subset that is required to be measured is selected from the antenna port subsets according to the current state information of the UE. In this case, as shown in FIG. 5, the determining unit U402 may include:

a selecting subunit U4021, configured to select an antenna port subset, which is required to be measured, for the UE from pre-partitioned antenna port subsets according to current state information of the UE;

or, a second selecting subunit, configured to select one or more antenna ports from all antenna ports of the base station according to the current state information of the UE to form an antenna port subset that is required to be measured.

If an antenna port subset is partitioned into multiple antenna port subsets beforehand, the partition may be based on multiple factors, for example, the partition may be performed according to time correlation of a channel. In this case, the antenna port subsets may include antenna port subsets applicable to different moving speeds of UEs; the current state information of the UE includes the current moving speed of the UE; and the selecting subunit U4021 may include:

a first selecting subunit, configured to select an antenna port subset applicable to the moving speed of the UE according to the current moving speed of the UE.

In a distributed antenna system, the antenna ports may be grouped into subsets according to geographic locations of the antenna ports. In this case, the antenna port subsets may include an antenna port subset grouped according to antenna geographic locations; and the current state information of the UE includes information on path loss between the UE and each antenna port subset and/or the current geographic location information of the UE; and the selecting subunit U4021 may include:

a second selecting subunit, configured to select an antenna port subset whose path loss to the UE meets a preset condition, according to the information on the path loss between the UE and each antenna port subset;

and/or, a third selecting subunit, configured to select an antenna port subset whose distance to the UE meets a preset condition, according to current geographic location information of the UE.

The antenna ports may also be grouped into subsets according to the transmission mode of the UE. In this case, the antenna port subsets include antenna port subset applicable to different transmission modes; the current state information of the UE includes the current transmission mode used by the UE; and the selecting subunit U4021 may include:

a fourth selecting subunit, configured to select an antenna port subset applicable to the transmission mode of the UE according to the current transmission mode used by the UE.

Transmission modes may include a CoMP transmission mode. When the antenna ports are grouped according to a transmission mode possibly used by the UE, special configuration may be performed for only the reference signal sent by an antenna port subset applicable to the CoMP mode, and the special configuration may not be necessarily performed for the reference signal of another antenna port. In this case, a system may further include:

a configuring unit, configured to configure only the reference signal sent by the antenna port subset applicable to the CoMP transmission mode according to the feature of the CoMP transmission mode.

If at least two antenna port subsets required to be measured are selected from the pre-partitioned antenna port subsets, the informing unit U402 may include:

a first informing subunit, configured to inform the UE to perform channel measurement for the reference signal of each antenna port subset that is required to be measured, and feed back channel state information of each antenna port subset that is required to be measured;

or, a second informing subunit, configured to inform the UE to perform channel measurement for the reference signal of each antenna port subset that is required to be measured, and feed back channel state information of each antenna port subset that is required to be measured and information on channel state cross-correlation between every two antenna port subsets required to be measured;

or, a third informing subunit, configured to combine all antenna port subsets required to be measured, and inform the UE to perform channel measurement for the reference signals of all the combined antenna port subsets required to be measured and to feed back the channel state information of the combination of all antenna port subsets;

or, a fourth informing subunit, configured to: combine a part of antenna port subsets required to be measured, and inform the UE to perform channel measurement based on the reference signals of the partially combined antenna port subsets required to be measured and to feed back the channel state information of each combination of antenna port subsets, and/or information on channel state cross-correlation between every two combinations of the antenna port subsets.

Figure 6:
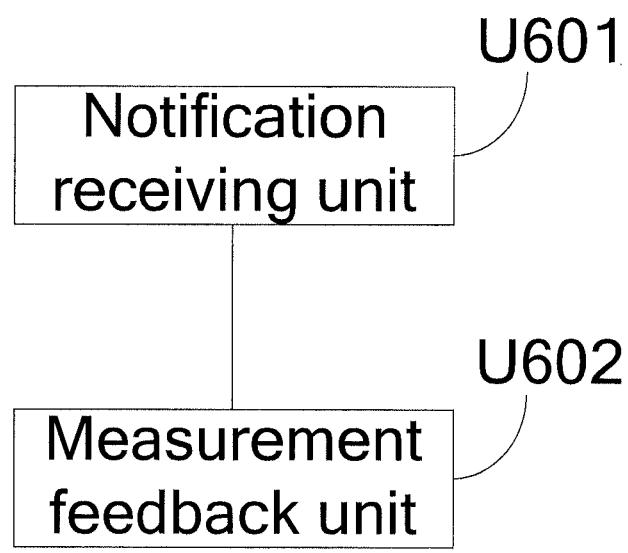
FIG. 6 is a schematic diagram of a user equipment according to an embodiment of the present invention.

Corresponding to the method and apparatus provided in Embodiment 1, an embodiment of the present invention provides a user equipment. As shown in FIG. 6, the user equipment includes:

a notification receiving unit U601, configured to receive a notification sent by a base station and learn an antenna port subset that is required to be measured, where the antenna port subset that is required to be measured is determined by the base station according to current state information of the user equipment; and a measuring and feedback unit U602, configured to perform channel measurement for the antenna port subset that is required to be measured and feed back channel state information.

The content such as the specific method of the base station determining an antenna port subset, which is required to be measured, according to the current state information of the UE is the same as the description above, and details are not repeated herein again.

Figure 7:
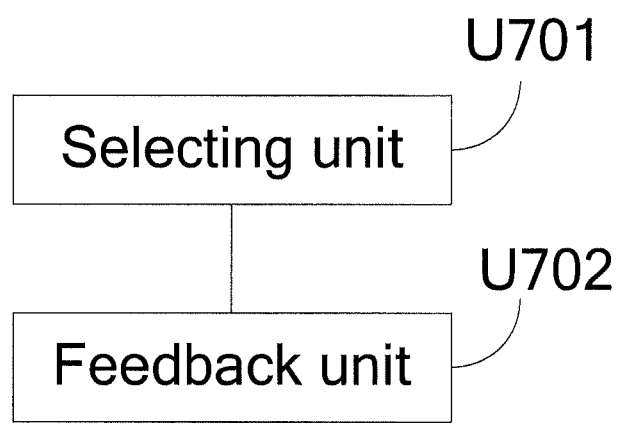
FIG. 7 is a schematic diagram of another apparatus according to an embodiment of the present invention.

Corresponding to the method provided in Embodiment 2, an embodiment of the present invention provides another apparatus for implementing channel measurement. Referring to FIG. 7, the apparatus includes:

a selecting unit U701, configured to select an antenna port subset that is required to be measured from pre-partitioned antenna port subsets according to current state information of a UE obtained from a base station; and a feedback unit U702, configured to perform channel measurement for the antenna port subset that is required to be measured and feed back channel state information.

Through the apparatus provided in this embodiment, according to the state information of a UE obtained from the base station and the partition of the antenna port subsets that is learned from the base station beforehand, the UE can select an antenna port subset that is required to be measured, so as to measure and feed back only the channel state information of a part of antenna ports. Therefore, the overhead generated by the feedback of the UE to the channel state information is reduced.

Specifically, the selecting unit U702 may include:

self state information obtaining subunit, configured to obtain current state information of the UE from the base station; and a selecting subunit, configured to select an antenna port subset that is required to be measured from the pre-partitioned antenna port subsets according to a mapping relationship between the current state information of the UE and the antenna port subset, where the mapping relationship is pre-negotiated with the base station.

When feeding back the channel state information to the base station, the UE may feed back identification information of actually measured antenna port subset. In this case, the apparatus may further include:

an identification information feedback unit, configured to feed back identification information of the antenna port subset to the base station.

When antenna port subsets required to be measured are at least two, the feedback unit U702 includes:

an as-stipulated feedback subunit, configured to: according to the order of feeding back the channel state information and/or a combination mode of antenna port subsets, perform channel measurement for the antenna port subset that is required to be measured and feed back channel state information, where the order and/or the combination mode is pre-negotiated with the base station;

or, a discretional feedback unit, configured to: select the order of feeding back the channel state information and/or a combination mode of antenna port subsets at discretion, perform channel measurement for the antenna port subset that is required to be measured and feed back channel state information; and feed back identification information of the antenna port subset and/or identification information of a combination of antenna port subsets.

The above describes in detail the method and apparatus for implementing channel measurement according to the present invention. Although the principle and implementation of the present invention are described through some specific examples, the description about the embodiments is merely for better understanding the method and core idea of the present invention, and on the basis of the idea of the present invention, those skilled in the art can make modifications to the specific implementation and the application scope of the present invention. In conclusion, the content of the specification should not be construed as the limitation on the present invention.

What is claimed is:

1. A method for implementing channel measurement, comprising:

determining, by a base station, a transmission mode of a user equipment (UE), wherein the transmission mode is a coordinated multi-point transmission (CoMP) transmission mode;

selecting, by the base station according to the CoMP transmission mode, an antenna port subset from antenna port subsets of antenna ports of the base station for the UE partitioned into the antenna port subsets according to antenna geographic locations to obtain channel quality for the selected antenna port subset only based on a channel state information reference signal transmitted from at least one antenna port included in the selected antenna port subset which excludes other channel state information reference signal transmitted from an antenna port excluded from the selected antenna port subset;

informing, by the base station, the UE of information of the selected antenna port subset; and in response to the informing, receiving, by the base station from the UE, channel state information in accordance with a channel measurement only for the selected antenna port subset based on the channel state information reference signal transmitted from the at least one antenna port included in the selected antenna port subset which excludes the other channel state information reference signal transmitted from the antenna port excluded from the selected antenna port subset, wherein the selecting the antenna port subset includes selecting the antenna port subset which path loss to the UE meets a condition according to path loss information between the UE and the selected antenna port subset.

2. The method according to claim 1, further comprising:
performing, by the base station, radio resource scheduling in accordance with the received channel state information for the UE.

3. A base station, comprising:
a transceiver, and
a processor coupled with the transceiver, wherein
the processor is configured to:
determine a transmission mode of a user equipment (UE)), wherein the transmission mode is a coordinated multi-point transmission (CoMP) transmission mode, select, according to the CoMP transmission mode, an antenna port subset from antenna port subsets of antenna ports of the base station for the UE partitioned into the antenna port subsets according to antenna geographic locations, to obtain channel quality for the selected antenna port subset only based on a channel state information reference signal transmitted from at least one antenna port included in the selected antenna port subset which excludes other channel state information reference signal transmitted from an antenna port excluded from the selected antenna port subset, and inform, via the transceiver, the UE of information of the selected antenna port subset; and the transceiver is configured to: receive, from the UE, channel state information in accordance with a channel measurement only for the selected antenna port subset based on the channel state information reference signal transmitted from the at least one antenna port included in the selected antenna port subset which excludes the other channel state information reference signal transmitted from the antenna port excluded from the selected antenna port subset, wherein the selected antenna port subset has a path loss to the UE that meets a condition according to path loss information between the UE and the selected antenna port subset.

4. The apparatus according to claim 3, wherein the processor is further configured to perform, via the transceiver, radio resource scheduling in accordance with the received channel state information for the UE.

5. A non-transitory computer program product, comprising computer program code, which, when executed by a computer unit, will cause the computer unit to perform:

determining a transmission mode of a user equipment (UE)), wherein the transmission mode is a coordinated multi-point transmission (CoMP) transmission mode;

selecting, according to the CoMP transmission mode, an antenna port subset from antenna port subsets of antenna ports of the base station for the UE partitioned into the antenna port subsets according to antenna geographic locations, to obtain channel quality for the selected antenna port subset only based on a channel state information reference signal transmitted from at least one antenna port included in the selected antenna port subset which excludes other channel state information reference signal transmitted from an antenna port excluded from the selected antenna port subset;

informing the UE of information of the selected antenna port subset; and in response to the informing, receiving, through a receiver from the UE, channel state information sent in accordance with a channel measurement only for the selected antenna port subset based on the channel state information reference signal transmitted from the at least one antenna port included in the selected antenna port subset which excludes the other channel state information reference signal transmitted from the antenna port excluded from the selected antenna port subset, wherein the selecting the antenna port subset includes selecting the antenna port subset which path loss to the UE meets a condition according to path loss information between the UE and the selected antenna port subset.

\* \* \* \* \*